United States Patent [19]

Davis et al.

[11] 3,914,996

[45] Oct. 28, 1975

[54] ELECTRONIC APPARATUS FOR DETERMINING THE WEAR OF A GUN TUBE

[75] Inventors: Harry J. Davis; Thomas W. Smith, both of Wheaton, Md.

[73] Assignee: The United States of America as represented by the Secretary of the Army, Washington, D.C.

[22] Filed: Apr. 30, 1974

[21] Appl. No.: 465,642

[52] U.S. Cl. .................. 73/167; 73/91; 235/151.3
[51] Int. Cl.² ............................................ G01L 5/14
[58] Field of Search .......... 73/35, 91, 167; 89/14 R, 89/135; 235/151.3; 346/38

[56] References Cited
UNITED STATES PATENTS

| | | | |
|---|---|---|---|
| 3,014,368 | 12/1961 | Musser et al. ...................... | 73/167 |
| 3,260,107 | 7/1966 | Rosen .................................. | 73/167 |
| 3,538,318 | 11/1970 | Clutterbuck et al. ............... | 73/167 X |

*Primary Examiner*—Richard E. Aegerter
*Assistant Examiner*—Frederick R. Schmidt
*Attorney, Agent, or Firm*—Nathan Edelberg; Robert P. Gibson; Saul Elbaum

[57] ABSTRACT

Electronic apparatus for determining the wear of a gun tube of, for example, an artillery weapon. The apparatus counts the number of rounds fired from the weapon, distinguishes the zone level of the round being fired, provides a weighted signal depending upon this zone level, and accumulates successive weighted signals in a memory unit which may provide instantaneous read-out of a number that corresponds to the amount of wear experienced by the barrel of the gun tube. The strain produced in the gun tube when a round is fired is sensed by transducer means. The transducer delivers a signal proportional to the sensed strain. The signal is first tested to determine if a valid firing has occurred. If so, a weighing circuit provides a weighted signal, for example in digital form, which is processed through a logic circuit to the memory. Successive firings are similarly weighed and counted to provide a running total inversely proportional to the remaining life of the gun tube. The memory means may comprise in one embodiment a non-volatile MNOS memory which requires associated compatible complementary logic circuitry. Alternatively, in another embodiment, the memory may comprise a current integrating electrolytic cell.

7 Claims, 4 Drawing Figures

ELECTRONIC APPARATUS FOR DETERMINING THE WEAR OF A GUN TUBE

RIGHTS OF THE GOVERNMENT

The invention described herein may be manufactured, used, and licensed by or for the United States Government for governmental purposes without the payment to us of any royalty thereon.

BACKGROUND OF THE INVENTION

1. Field of the Invention

The present invention relates to electronic apparatus, and, more particularly, to an electronic apparatus for counting and weighing the number of rounds fired from the gun tube of an artillery weapon.

2. Description of the Prior Art

It is often very important to be able to determine the amount of wear undergone by the barrel or gun tube of an artillery weapon. An accurate and reliable determination of the foregoing is particularly important in two respects. First, the barrel of the gun, as wear progresses, is subject to fatigue and possible failure. Accordingly, to prevent disasterous accidents and to maintain a sufficient inventory, it is important to be able to determine at any given time the remaining useful life of the gun tube. Secondly, the wear of the gun tube is proportional to the number of rounds fired and the zone of firing or charge utilized to fire each round. Accordingly, the barrel of the weapon is continuously wearing out as a function of these two factors. Since the wear on the gun tube affects the accuracy of the weapon, it is important to know at any given time information as to the previous "wear and tear" exerted on the gun tube so that firing corrections may be made and accuracy improved.

Present techniques employed for determining the "wear and tear" or remaining useful gun life have been limited to manually recording information as to the number of rounds and charge utilized for each round in what is known as "gun books". Due to the human error involved in the recording of this information, such methods have been less than satisfactory. Further, the information recorded in the gun books must be manually and tediously transformed into information related to the remaining useful life of the weapon.

A need exists, therefore, for a rugged and reliable apparatus which may instantaneously provide information relating to the wear and tear or remaining useful gun life of an artillery weapon.

SUMMARY OF THE INVENTION

It is accordingly a primary object of the present invention to provide an electronic apparatus for determining the wear of a gun tube of an artillery weapon.

Another object of the present invention is to provide an electronic device which automatically counts and stores the number of rounds fired from the gun tube of an artillery weapon.

An additional object of the present invention is to provide an electronic apparatus for counting the number of rounds fired from the gun tube of an artillery weapon which distinguishes the zone level of the round being fired.

A still further object of the present invention is to provide an electronic apparatus for determining the wear of a gun tube which maintains accuracy and reliability over an extended period of time and which is rugged enough to survive under field combat conditions.

An additional object of the present invention is to provide an electronic apparatus for determining the wear of a gun tube which stores the recorded information and is capable of providing the total, weighted count of the number of rounds fired when interrogated by external means.

A still further object of the present invention is to provide an electronic device for determining the wear of a gun tube in an artillery weapon which is economical, capable of being utilized with a variety of weapons, and which does not interfere with the weapon's life, handling, use or safety.

An additional object of the present invention is to provide an electronic apparatus for counting and weighing the number of rounds fired from the gun of an artillery weapon which preferably derives power for its operation from the gun barrel upon firing and therefore does not require an expendable power supply.

The foregoing and other objects are attained in accordance with one aspect of the present invention through the provision of an electronic device for determining the wear of a gun tube of an artillery weapon which comprises transducer means connected to the gun tube for generating a firing signal in response to a firing signature, such as strain, created in the gun tube upon the firing of a round therefrom. The device further includes means responsive to the magnitude of the firing signal for generating a weighted signal proportional to the charge used to fire the round. Memory means are provided for storing the weighted signal and for accumulating successive weighted signals whereby the total stored in said memory means is indicative of the wear of the gun tube. The device preferably includes a threshold detecting circuit and a signature detecting circuit which respectively pass only those signals received from the transducer whose amplitude, rise time and duration exceed predetermined values corresponding to an actual firing of the round from the gun tube. A logic circuit is gated by the outputs of the threshold and signature detecting circuits for causing the weighted signal to be fed to the memory means. In one embodiment, the memory means comprises a nonvolatile MNOS memory unit and associated input circuitry. In another embodiment, the memory means comprises an electrolytic cell which integrates the current of the weighted signal.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
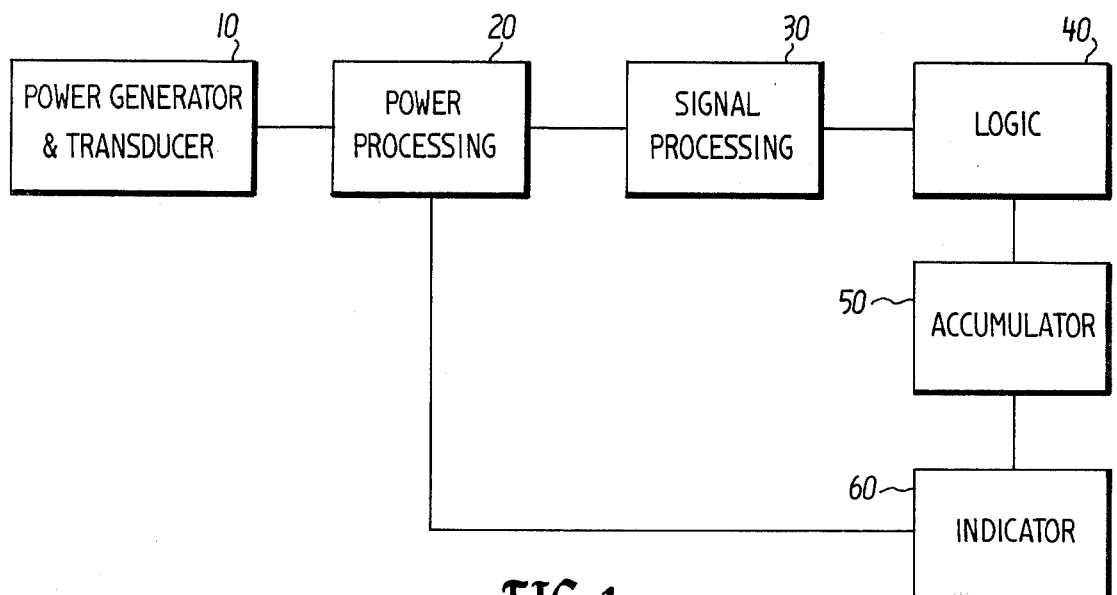
FIG. 1 is a block diagram of an electronic apparatus according to a first preferred embodiment of the present invention.

An acceptable electronic rounds counter must, of course, be driven by an acceptable gun firing signature. Signatures characteristic of the firing of the gun considered for the present invention were recoil, internally measured breech pressure, temperature, muzzle pressure, muzzle flash, and possibly manual setting by the gunner. All of the foregoing have various disadvantages. For example, to utilize the recoil of the gun as the signature for counting the rounds excludes applicability of the device to, for example, recoilless rifle. Also recoil in mortars is dependent upon the conditions of the baseplate's support. To provide commonality among artillery weapons, mortars, recoilless rifles, and indeed all tube launched weapon systems, recoil must be rejected as the source of the signature. Internally measured breech pressure as a rounds counter signature would require drilling holes in the gun tube to sense the pressure and thus should be omitted for safety reasons. Temperature cannot be considered as an acceptable signature since the temperature of the round is relatively independent of the zone of firing or charge, an important factor with respect to the wear of the gun. Muzzle pressure, as well as muzzle flash, are phenomena which would require greatly detailed studies under hazardous conditions to determine a proper signature, and are therefore unacceptable. Finally, manual setting of the device by the gunner according to the zone of charge again subjects the accuracy of the device to human error and is accordingly unacceptable.

We have discovered a firing signature the characteristics of which meet and exceed the requirements of an electronic rounds counter as aforedescribed. Such a signature, as we have discovered, is the strain induced in the gun tube when a round is fired. Extensive studies have been conducted to determine the characteristics of such a signature. Since the pressure of the gas in the gun tube varies with the rate of burning of the propellant and with its expansion behind the projectile as it moves up the tube, the tube strain is in turn dependent upon the gas and engraving band pressures and upon the wall thickness. Theoretical calculations based on the strains measured in the barrel near the breech of an M68, 105 mm gun indicated that in similar weapons such strains would occur in distinct levels as a function of the zone of firing. Accordingly, sensing the amplitude of the strain at the breech provides a means of determining the zone of firing. Alternatively, it was discovered that strains measured near the muzzle of the weapon could be utilized if multiple strain sensors were used and the velocity of the projectile as it goes up the tube was determined by measuring the velocity of the strain pulse. Accordingly, it was concluded that measuring the amplitude of the strain near the breech or the velocity of the strain pulse near the muzzle of a gun were viable means for not only counting the number of rounds fired, but providing a built-in weighing function according to the zone of firing or charge utilized.

Referring now to the drawings, wherein like reference numerals designate identical or corresponding parts throughout the several views, and more particularly to FIG. 1 thereof, there is depicted a block diagram of a system incorporating the principles of the present invention in a first preferred embodiment. The system comprises a power generator and transducer 10 which preferably is utilized both to generate the strain signature upon firing and to provide power for the rest of the device. Suitable for use as transducer 10 would be, for example, a self-generating transducer such as a magnet and coil assembly or a piezoelectric crystal. Such components are well known in the art and should be mounted on the exterior of the gun tube as aforedescribed to sense, for example, the strain-induced signature near the breech of the weapon. Accordingly, the piezoelectric crystal or magnet-coil combination 10 generates power for the operation of the device and is utilized to generate the strain-induced signal on firing. Such a signal is fed to a power processing circuit 20 to control the voltage so that it does not exceed the capabilities of the circuitry. A signal processing circuit 30 receives this amplitude controlled signal from power processing circuit 20. Circuit 30 acts as a discriminating circuit to prevent false alarm signals, such as those which may be generated while transporting the weapon, from being accepted as bona fide firing signatures. Once accepted by circuit 30, the signal is passed onto logic circuit 40 where it is weighted and then stored in an accumulator 50. The system may also include an indicator 60 to respond to the total count stored in accumulator 50. Indicator 60 may take the form of a visual read-out meter and may be powered from part of the signal generated by circuit 10 or be provided with its own power source.

Figure 2:
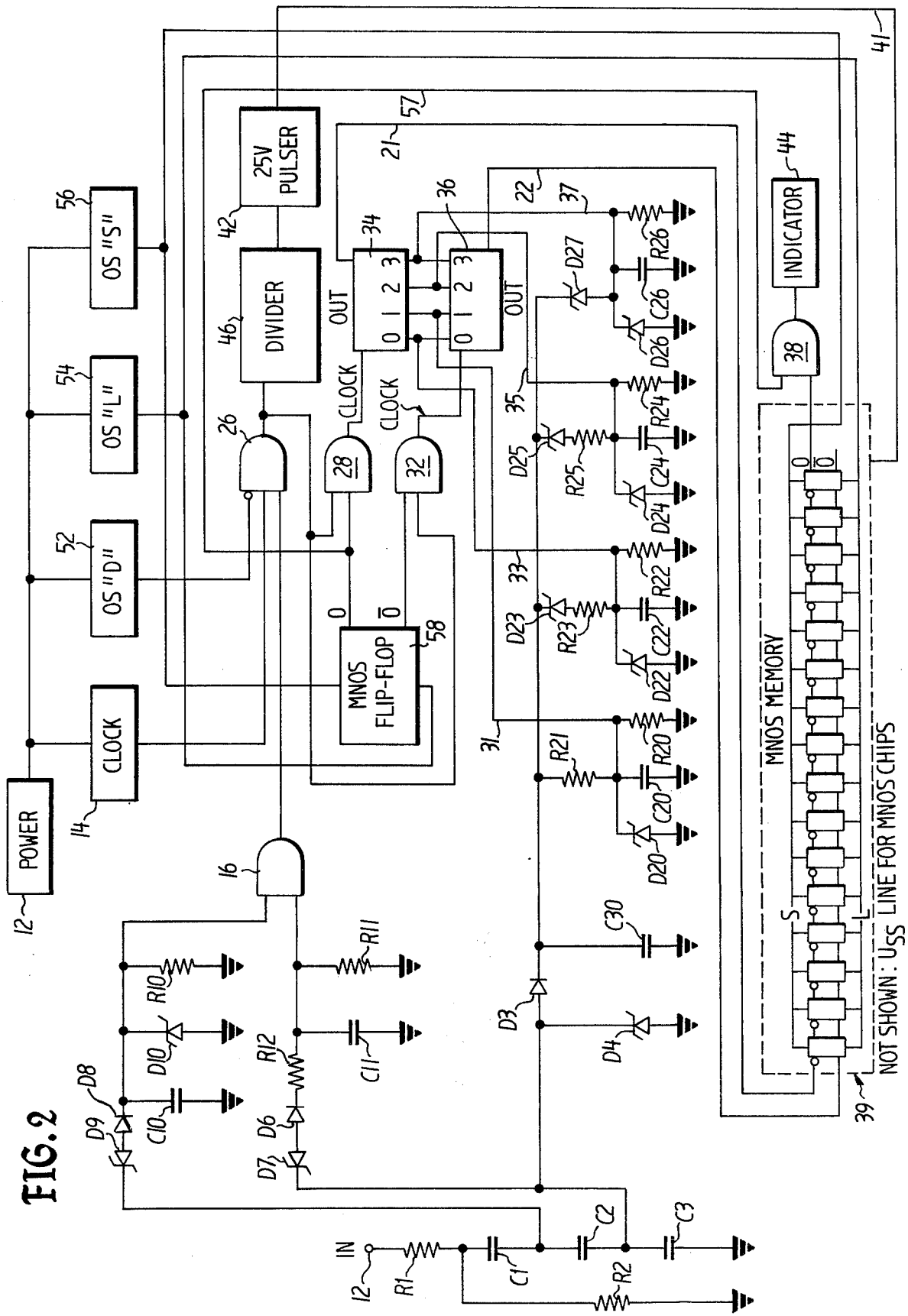
FIG. 2 is a schematic circuit diagram of a system corresponding to the block diagram of FIG. 1.

Referring now to FIG. 2, a detailed circuit embodying the features described with reference to FIG. 1 is shown wherein the strain-induced signature from, for example, a piezoelectric crystal, is received at input 12. Resistor R1 is connected in series with capacitor C1, C2 and C3 which are respectively connected in parallel with resistor R2. The foregoing basically form a voltage dividing network to increment the strain-induced firing signal into acceptable levels for the remainder of the circuitry. R1, C1, C2 and C3 form a charging time constant circuit whose values are selected so that short duration pulses will be rejected. The discharging time constant circuit is provided by selecting an appropriate value for resistor R2. That portion of the signal stored on capacitor C1 is fed to a threshold detector circuit consisting primarily of diodes D9 and D10. The threshold values of these Zener diodes requires a minimum signal amplitude of, for example, 250 volts to appear at its input. When this threshold is reached, capacitor C10 charges to a value of, for example, 12 volts. Resistor R10 discharges C10 before the next firing signal. The 12 volt signal across C10 provides an enabling input to AND gate 16. The other enabling input to AND gate 16 is provided by a signature detector circuit which taps off the charge stored on capacitor C2. The signature detector circuit consists primarily of capacitor C11, and resistors R11 and R12. The time constant provided by R12 C11 establishes a minimum rise time for the signal while the R11 C11 time constant establishes a minimum duration for the signal. The Zener diode D7 requires a minimum amplitude signal of 30 volts to appear at the input. Accordingly, when the threshold detector circuit indicates a proper amplitude signal, and the signature detector circuit indicates a signal having the proper rise time and duration, AND gate 16 is enabled to provide an output to AND gate 26.

A third portion of the input firing signal is fed through diode D3 to the weighting circuit. The purpose of the weighting circuit is to determine the magnitude of the strain-induced signal and generate a weighted signal indicative of that magnitude. The magnitude of the strain-induced signal, as explained above, is directly proportional to the zone of firing or, in other words, the amount of charge utilized to fire the round. There are customarily eight zones of firing delineated for artillery projectiles. The above-mentioned study of strain-induced firing signatures showed that the strain differences within zones 1, 2, and 3 and within zones 4, 5, and 6 are slight, and thus the variations in wear produced by a zone variation within each group is similarly slight. Accordingly, zones 1, 2 and 3 can be grouped together as a single wear-producing zone, as can zones 4, 5, and 6. It was also found that zone 7 and zone 8 each produce distinct wear-influencing strain signatures and thus must be kept separately identifiable in the weighting circuit. Accordingly, in the weighting circuit of FIG. 2, Zener diode D4 ensures that the impressed voltage will not exceed, for example, 40 volts. The input is stored on capacitor C30. Resistor R21 forms the input to the zone 1, 2 and 3 weighting circuit; diode D23 forms the input to the zone 4, 5 and 6 weighting circuit; diode D25 forms the input to the zone 7 weighting circuit; and diode D27 forms the input into the zone 8 weighting circuit. Preferably, diodes D20, D22, D24 and D26 each have the same threshold values. Similarly, capacitors C20, C22, C24 and C26 are all of equal value, as are resistors R20, R22, R24 and R26. However, the threshold value of diode D23 is less than that of diode D25 which is less than that of diode D27. Accordingly, the amplitude of the voltage appearing across capacitor C30 and the values of the Zener diode combinations in the various portions of the weighting circuitry determine which capacitors C20, C22, C24 and/or C26 are charged. For example, if the portion of the firing signal impressed across capacitor C30 has a magnitude of 7 volts, which may, for example, indicate a zone 6 firing, capacitors C20 and C22 will each be charged to the value permitted by diodes D20 and D22, respectively; while the values of diodes D25 and D27 will prevent their respective capacitors, C24 and C26, from charging. In this event, an output signal will be provided along lines 31 and 33 only. On the other hand, if for example, a zone 8 firing signal were present of, say, 25 volts, all of the respective capacitors would be charged and lines 31, 33, 35 and 37 would all deliver output signals. Resistors R21, R23 and R25 function as current limiters, while resistors R20, R22, R24 and R26 function as bleeder resistors to discharge the capacitors between rounds.

Timing circuitry is provided which comprises a clock pulse generator 14, and one shot circuits 52, 54 and 56. Power may be provided by a circuit designated by the numeral 12 to correspond to the transducer generated signal as mentioned hereinabove. Clock 14 feeds pulses to an enabling input of AND gate 26, the other enabling input to AND gate 26 being provided by gate 16 as described hereinabove. The outputs of one shot 54 and one shot 56 are fed to MNOS memory 39. MNOS design is selected for its non-volatile memory capability. This means that this MNOS circuitry remembers the status of a flip-flop circuit after the removal of the power supply and, after the restoration of power, resets the flip-flop circuit to the complement of its previous state. MNOS memory 39 is set or restored to power on status by means of one shots 54 and 56. One shot circuit 52 provides a signal to the non-enabling input of gate 26 to delay the output of gate 26 until MNOS memory 39 is restored to power on status by means of the "L" and "S" signals from one shots 54 and 56, respectively. One shots 52, 54 and 56 are all simultaneously activated and have respectively decreasing pulse widths.

Outputs from one shot 54 and one shot 56 are also fed to an MNOS flip-flop 58 which alternately delivers an output to AND gates 28 and 32, respectively. Due to the nature of MNOS memory 39, i.e., upon the restoration of power, it is reset to the complement of its previous state, an alternating incrementing process is utilized to alternatively add the weighted count to the memory and subtract the next weighted count from the complement of the previous result. The foregoing alternating process is controlled by MNOS flip-flop 58 in conjunction with a pair of parallel-in, series-out shift registers 34 and 36. Shift registers 34 and 36 each receive in parallel form the weighted signal from the weighting circuit along lines 31, 33, 35 and 37. AND gates 28 and 32 deliver a clock pulse to shift registers 34 and 36, respectively, according to the state of MNOS flip-flop 58. That is, depending on the output state of flip-flop 58, which in turn depends upon the previous state of MNOS memory 39, a clock pulse from the output of AND gate 26 is delivered through either AND gate 28 or AND gate 32 to dump the contents of either shift register 34 or shift register 36 serially along either line 21 or line 22, respectively. Line 21 and shift register 34 represents the adding input to MNOS memory 39, while line 22 and shift register 36 represent the subtracting input to MNOS memory 39.

In summary, it is known that MNOS circuitry requires a set type of operation to bring it from the "power off" state to the "memory recovered" state. This operation consists of the application of the power supply, then the application of a long and a short pulse, initially coincident. The foregoing operation is provided by means of one shots 54 and 56 which bring memory 39 to its "memory recovered" state. The previous count having been restored in memory 39, flip-flop 58 in conjunction with either shift register 34 or 36 and the weighting circuitry will increase that count by a weighted increment representing the present firing signal, and will store that new count in the MNOS memory 39. The MNOS flip-flop 58 controls the alternating process whereby the weighted increment is added to the count in the memory, and the next weighted count is subtracted from the complement of the previous count.

Divider 46 and pulser 42 are provided to feed a set pulse along line 41 to MNOS memory 39 before power is cut off prior to the firing of the next round. Divider 46 is activated after, for example, four clock pulses which are needed to serially read out the data in registers 34 or 36. Thereafter, divider 46, which may comprise a string of flip-flops, activates pulser 42 to set memory 39.

The output from memory 39 is fed to an enabling input of AND gate 38; the other enabling input to AND gate 38 is provided from the "positive" output of MNOS flip-flop 58 along line 57. The foregoing ensures that the contents of MNOS memory 39 will only be read during its "positive", and not complementary, cycle. An indicator 44, which may comprise, for example, a plug-in digital meter, provides a visual indication of the total, weighted count stored in memory 39 and thereby provides a readily available indication at any given time of the wear of the particular gun tube being monitored.

Figure 3:
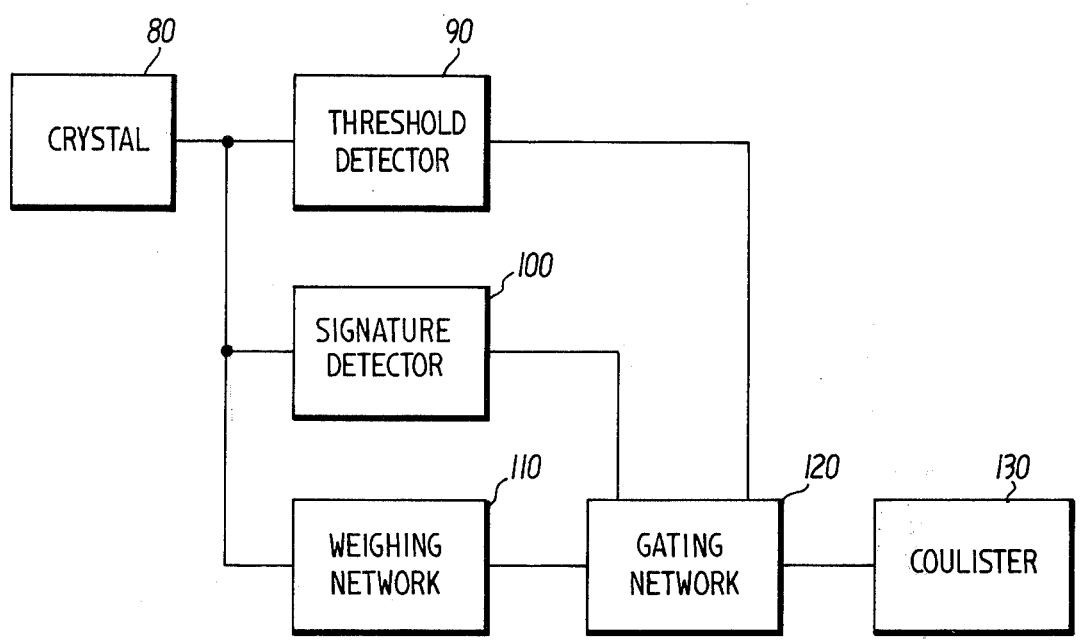
FIG. 3 is a block diagram of a second and alternative preferred embodiment of the present invention.

Referring now to FIG. 3, an alternative preferred embodiment of the present invention is depicted wherein the firing signal from crystal 80 is fed to a threshold detector 90, a signature detector 100, and a weighting network 110. The foregoing components may be identical to the ones just described above with reference to FIGS. 1 and 2. However, the essence of this second embodiment centers around the use of a "coulister" or electrolytic cell. Coulister 130 is an electrochemical current integrating device which is utilized to integrate a series of current pulses representing the stresses on the gun tube. Electrolytic cells are well known in the art as integrating, counting and timing devices and operate by means of the physical transfer of atoms of metallic silver across an electrolyte. The device generally has a central gold electrode and an outer silver electrode which also serves as the case. When current flows in one direction, the positive silver ions in the electrolyte are deposited on the gold electrode and the cell has a low resistance. When current is applied in the opposite direction, the device exhibits a low resistance as long as there is silver remaining on the working electrode. As soon as the silver has been depleted from the gold electrode, the cell changes to a high resistance state. Since the flow of current is accompanied by a transfer of silver from one electrode to the other, the device is a true integrator of the current input. At any time, the quantity of silver accumulated on the working electrode represents the true value of the integral of the current that has passed through the device. Such a device is known in the art and is manufactured under a number of trade names, such as for example "E-CELL" manufactured by the Bissett-Berman Corporation of California.

In contradistinction to the first preferred embodiment described above, the system of FIG. 3 requires no registers but rather a gating network 120. The timing sequence for the gating network is such that the input to the weighting circuit 110 is disabled before the storage capacitors are discharged into the coulister 130.

Figure 4:
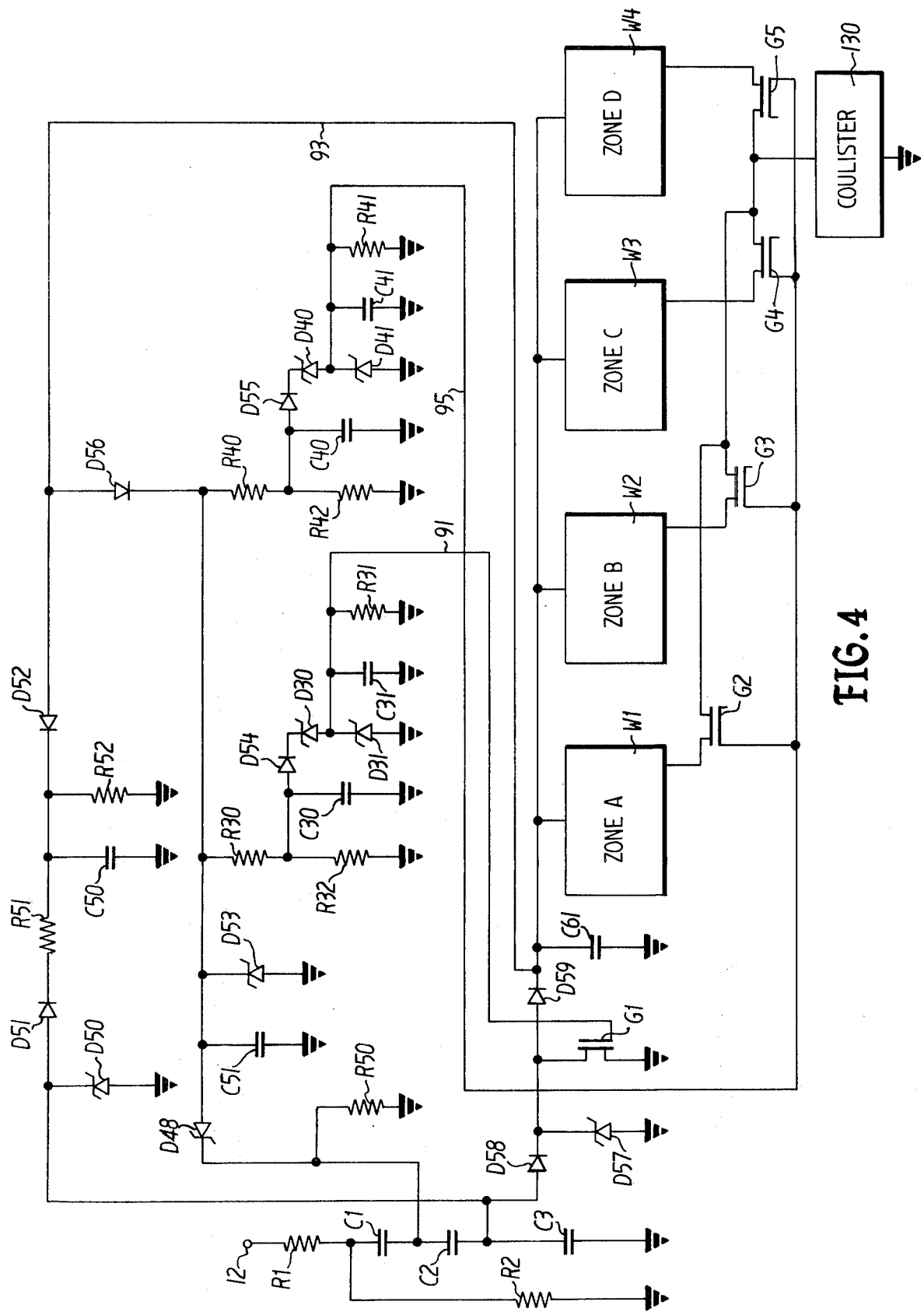
FIG. 4 is a schematic circuit diagram incorporating the system of the second embodiment depicted in FIG. 3.

Referring now to FIG. 4, a detailed circuit diagram of the system of FIG. 3 is shown wherein diode D48 and D53 establish a minimum threshold for a charge to be impressed upon capacitor C51. The discharge path for capacitor C51 is across resistors R30 and R32 whereupon capacitor C30 is charged. The signature detector consists of resistor R51 and R52 and capacitor C50 which, similar to the embodiment depicted in FIG. 2, establish a minimum rise time and duration for the input signal.

The output from the threshold detector circuit, which appears across capacitor C51, is fed to a first timing circuit consisting primarily of resistor R30 and capacitor C30. The R30 C30 time constant determines the voltage across capacitor C30. When the voltage across capacitor C30 reaches about, for example, 7.3 volts, Zener diodes D30 and D31 pass current to charge capacitor C31. Resistor R31 functions as a bleeder resistor to discharge capacitor C31 between rounds.

Similarly, the output of the signature detector circuit, which appears across capacitor C50, is fed through diode D56 to a second timing circuit consisting primarily of resistor R40 and capacitor C40. The R40 C40 time constant determines the voltage across C40. When the voltage across C40 reaches a certain threshold, Zener diodes D40 and D41 pass current to charge capacitor C41. Resistor R41 functions as a bleeder resistor to discharge capacitor C41 between rounds. The time constant of this second timing circuit is set to be longer than that of the first timing circuit described above.

The weighting circuits W1, W2, W3 and W4, shown for simplicity in block diagram form, are fed a portion of the signal as limited by diode D57. Once the proper signature is determined, a signal is fed via line 93 to bias diode D59 into conduction so that the weighting circuits may weight the input signal according to the zone of firing, as discussed in detail above. When capacitor C31 is charged, an output is delivered via line 91 to a gating device G1, which preferably comprises a field effect transistor. The gated input to G1 effectively grounds the input to the weighting circuit to cut off any further current from capacitors C1, C2 or C3. At the end of the time interval determined by the second timing circuit, signified by a voltage across capacitor C41, an output signal is fed via line 95 to the gates of gating devices G2, G3, G4 and G5. Those devices, which preferably comprise field effect transistors, are connected to deliver the outputs of the weighting circuits W1, W2, W3 and W4, respectively, to coulister 130.

Interrogation of the coulister counter 130 involves deplating the electrolyte from the electrode. By accurately recording the time-current integral, the state of the coulister can be determined. A false indication of the end of the deplating process can occur if it occurs at an accelerated rate. A way to avoid the foregoing problem is to deplate at a fast rate until the coulister appears unplated and then use an order of magnitude less current to finish the operation.

It is seen that we have provided a highly useful electronic device for instantaneously determining the wear of a gun barrel of an artillery weapon. The device, in both preferred embodiments, counts the number of rounds fired, distinguishes the zone level of the round being fired, is able to survive and function under severe gun environments, records the information via a non-volatile memory, is inexpensive to manufacture, does not interfere with the weapon's life, handling, use or safety, is able to yield the total, weighted count when interrogated by external means, may be adapted to visually indicate the total count, may be utilized with various different types of weaponry such as rifles or artillery, mortars, and recoilless rifles, as well as tube launched weapon systems, and does not require the use of an expendable power supply.

Obviously, numerous modifications and variations of the present invention are possible in light of the above teachings. For example, one skilled in the art realizes that magnetic cores in particular may be highly adaptable for use as the non-volatile storage element. Instead of a self-generating transducer, a strain gauge could be utilized in conjunction with long-life batteries.

Accordingly, we wish it to be understood that we do not desire to be limited to the exact details of construction shown and described, for obvious modifications can be made by a person skilled in the art.

What is claimed as new and desired to be secured by Letters Patent of the United States is:

1. Electronic apparatus for determining the wear of a gun tube of an artillery weapon, which comprises:
   a gun tube which develops a strain upon the firing of an artillery round therefrom;
   transducer means connected to said gun tube for generating as an output a firing signal in response to said strain, the magnitude of said firing signal being proportional to the charge used to fire said round;
   means automatically responsive to the magnitude of said firing signal for electrically generating a weighted digital signal also proportional to the charge used to fire said round;
   memory means for storing said weighted signal and for accumulating successive weighted signals whereby the total stored in said memory means is indicative of the wear of said gun tube;
   signal processing means connected to receive said output from said transducer means for electronically discriminating against the passage of each output which falls below a predetermined minimum value which corresponds to an actual firing of said round from said gun tube, said signal processing means comprising threshold detecting circuit means which produces an output only in response to those firing signals whose amplitude exceed a predetermined value, and signature detecting circuit means which produces an output only in response to those firing signals whose rise time and duration exceed predetermined values; and
   logic means responsive to the outputs of said threshold detecting circuit and said signature detecting circuit for causing said weighted signal to be fed to said memory means.

2. The electronic apparatus according to claim 1 wherein said logic means comprises:
   shift register means for receiving and storing as its contents said weighted signal from said weighted signal generating means;
   clock pulse generating means; and
   gating means connected to said clock pulse generating means and to said signal processing means for effectuating the transfer of said contents of said shift register means to said memory means.

3. The electronic apparatus according to claim 2 wherein said memory means comprises an MNOS memory.

4. The electronic apparatus according to claim 3, wherein said logic means further comprises:
   a plurality of one shot circuits for providing restoration signals to said MNOS memory; and
   an MNOS flip-flop circuit means connected to said one shot circuits for changing its output between two alternative states in response thereto;
   wherein said shift register means comprises first and second parallel-in, series-out shift registers and wherein said gating means is further responsive to said alternative outputs from said MNOS flip-flop circuit means for alternatively gating said clock pulses to said first and second shift registers.

5. The electronic apparatus according to claim 1 wherein said memory means comprises electrolytic cell means for integrating the current of said weighted signal.

6. The electronic apparatus according to claim 5 wherein said logic means comprises:
   first and second timing circuits respectively responsive to said threshold detecting circuit means and said signature detecting circuit means for providing first and second timing signals; and
   first and second gating circuits respectively responsive to said first and second timing signals for grounding said weighted signal generating means and for causing said weighted signal to be fed to said electrolytic cell means, respectively.

7. The electronic apparatus according to claim 6, wherein said first and second gating circuits are comprised of field effect transistors.

* * * * *